UNITED STATES PATENT OFFICE.

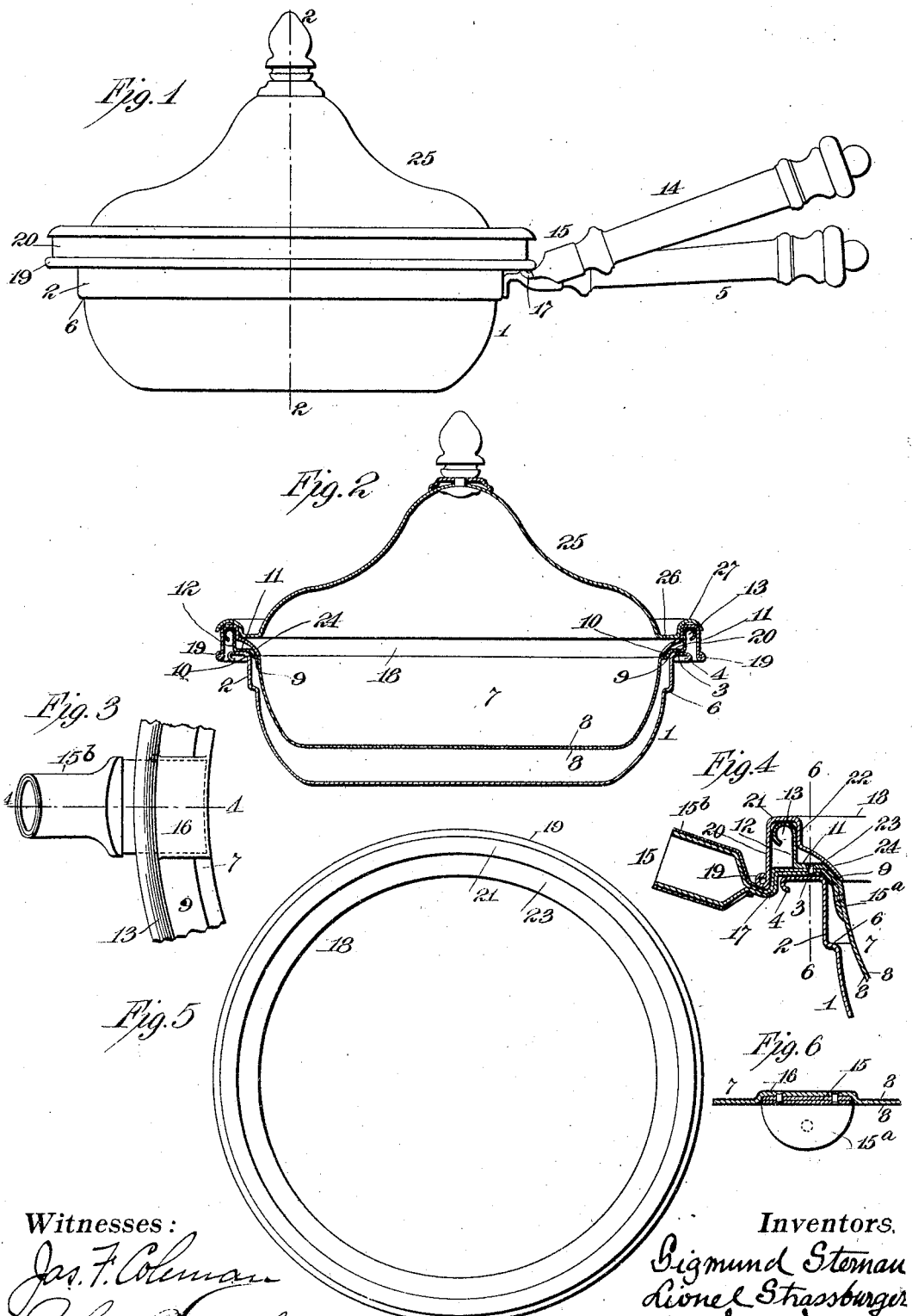

SIGMUND STERNAU AND LIONEL STRASSBURGER, OF NEW YORK, N. Y., ASSIGNORS TO S. STERNAU & COMPANY, OF NEW YORK, N. Y.

CHAFING-DISH.

933,136.      Specification of Letters Patent.      Patented Sept. 7, 1909.

Application filed February 25, 1905. Serial No. 247,383.

*To all whom it may concern:*

Be it known that we, SIGMUND STERNAU and LIONEL STRASSBURGER, both citizens of the United States, and both residing in the borough of Manhattan, city of New York, State of New York, have invented a certain new and useful Improvement in Chafing-Dishes, of which the following is a specification.

The object we have in view is the production of a chafing dish wherein the food dish may be made of enamel, but which will be so arranged that when it is resting within the hot water pan, the enamel will not be visible, but the upper edge thereof will be covered by an annular structure which will be formed of metal and having the same finish as the hot water pan and cover.

A further object is to produce a device of this character, which may be readily cleaned and will have no cracks or crevices which are inaccessible.

We attain these objects by the device illustrated in the accompanying drawings, in which, Figure 1 is a side view of a food pan, hot water dish and cover, embodying one form of our invention. Fig. 2 is a section taken on the lines 2—2 of Fig. 1. Fig. 3 is a top view of a portion of the food pan. Fig. 4 is a section taken on the lines 4—4 of Fig. 3. Fig. 5 is a perspective view of the annular protecting cover for the food pan; and Fig. 6 is a section taken on the lines 6—6 of Fig. 4, of the food-dish, separated from the other parts of the device.

In all the views like parts are designated by the same reference characters.

In carrying out our invention we provide a hot water dish 1 formed of sheet metal, and having a finish to harmonize with the rest of the outfit. This hot water dish is provided with an annular enlarged portion 2, and outwardly extending horizontal flange 3, with a bead 4, at its outer extremity. This water dish may be provided with the usual lifting handle 5. The enlarged annular portion 2 is connected to the body of the dish by a horizontal flange 6 which serves as a means for supporting the dish within the ring of the chafing dish stand.

In connection with the water dish 1, is employed a food pan 7 preferably coated on both sides with enamel 8. This food pan is of less depth than the hot water dish. Near its top it is formed with an outwardly extending horizontal flange 9 which connects at its outer portion with a vertical annular portion 10. Adjacent to the vertical annular portion 10 the pan is formed with a horizontally extending outwardly projecting flange 11. Beyond this is an upwardly extending annular portion 12 provided with an overhanging bead 13. The vertical annular portion 10 is of the proper size to fit snugly within the annular enlarged portion 2 of the hot water dish and allow the flange 11 to rest upon the flange 3 so as to firmly support the food pan within the hot water dish. The food pan is provided with a handle 14 which is attached to a metal projection 15. This projection is riveted as shown in Fig. 4 to the food pan before the latter is enameled, and it, together with the rivets are covered with the enamel. Adjacent to the projection 15 the flange 11 is inset at 16, a sufficient distance so that the projection 15 will not extend below the plane of the flange. The projection 15 extends outward a sufficient distance so that the projection the food pan is resting within the hot water dish, and is bent with a downward curve at 17. By insetting the projection within the flange, no undesirable extension is made below the plane of such flange and the food pan will be supported upon the entire surface of the flange 11. The projection is in the form of a tube, which is flattened when in engagement with the food pan. Below the flange 11 one of the walls may be removed as shown, so that a single wall 15ᵃ will engage with the flanges 9 and 10 and the side of the pan but the removal of this wall is not necessary, and the device may be made with the both walls extending the same distance. The rivets pass through the doubled portion and the flange 11, and additional rivets may pass through the single wall 15ᵃ and the side of the pan. By this construction any undesirable extension to the sides of the pan is prevented, and the pan will rest snugly and firmly within the hot water dish. The tubular portion of the projection being enameled, as is necessary owing to the process of manufacture, is hidden by a sheath or cover 15ᵇ, which is in the form of a short length or tube of metal, having the same finish and appearance as the hot water pan. This sheath is secured in place by pinching the inner end together to cause it to conform to the shape of the projection 15.

For the purpose of concealing and protecting the upper edge of the food pan, an annular cover 18 is provided. This cover is made of material similar in finish and appearance to the hot water dish and chafing dish cover 25 and is constructed as shown in Figs. 2 and 5. The cover is preferably made of elastic sheet metal, either polished or plated, but sufficiently thin to be elastic, but this elastic feature is not absolutely necessary. The outer portion of the ring is formed with a bead 19, and a vertically extending portion 20. Inside of this is a horizontally extending portion 21 slightly curved as shown and adapted to rest upon the outer flange 13 of the food pan. Inside is a downwardly extending annular portion 22 slightly smaller than the annular portion 12 of the food pan and below this is an inwardly extending annular horizontal portion 23, which is adapted to rest upon the flange 11 of the food pan. The inner edge of this projecting portion is curved at 24, which engages with the vertical portion 10. The inner surface of the annular cover 18 is therefore practically the same size and configuration as the upper surface of the inside portion of the food pan, whereby the annular cover will be securely held in position. By making the annular cover 18 of elastic metal and making a very close fit, it can be sprung within the upturned flange 12 of the food pan and will not thereby accidentally be displaced, yet will permit the ready separation of the two when desired. When the annular cover is made of an inelastic metal, it is designed to fit closely and snugly in place, so that it can be readily removed. The depending portion 20 is sufficiently deep to entirely conceal the projecting upper edge of the food pan when in place within the hot water dish, as shown in Fig. 2. The bead 19 extends down to the same level as the bead 4 of the hot water pan, but is sufficiently outside thereof to permit the passage of the curved portion 17 of the handle projection 15.

A chafing dish cover 25 having an outwardly extending horizontal annular portion 26, and a curved portion 27 rests upon the annular cover 18 and does not come into direct contact with the food pan.

By constructing the annular cover 18 entirely separate from the enamel portion of the food pan, it can be readily removed and the upper edge of the latter cleaned. In previous constructions in which a protecting band or edge is permanently attached to the enamel portion of the food pan, a crevice is formed on the inside and outside between the parts, which prevents thorough cleaning. In the previous constructions with permanently attached annular bands, the objects of cleanliness and wholesomeness sought to be attained by the use of the enamel are not accomplished, owing to the impossibility of cleaning the separating space between the enamel and band. Such devices therefore are no better than unenameled food pans and are really not so good, as they are open to the objection of having parts which are so unaccessible that they cannot be cleaned.

Having now described our invention, what we claim and desire to secure by Letters Patent, is:—

1. In a chafing dish, the combination with a hot water dish, of an enameled food pan having an attached handle thereon and extending outside of the hot water dish, and a separable annular cover, the said cover engaging with the edge of the food pan and forming a close joint therewith with the handle projecting below the cover.

2. In a chafing dish, the combination with a hot water dish, of an enameled food pan having an attached handle thereon extending outside the hot water dish and a separable annular cover, the said cover engaging with the edge of the food pan and forming a close joint therewith, the said cover having a depending portion, which conceals the outer edge of the food pan the handle projecting below the cover.

3. In a chafing dish, the combination with a hot water dish, of an enameled food pan having the horizontally projecting flange 11, and the upward extending portion 12, the said flange resting upon the hot water dish, and an annular cover which rests upon the flange 11 and engages with the projecting portion 12.

4. In a chafing dish, the combination with a hot water dish, having an outward extending flange, an enameled food pan having an outwardly extending flange portion engaging with the hot water dish, the said flanged portion of the food pan being recessed and a handle attachment located within the recess and secured to the food pan and between the two flanges.

5. In a chafing dish, a food pan, having a tubular handle attachment secured thereto, the pan and attachment being enameled, and a sheath of unenameled metal surrounding a portion of the attachment.

This specification signed and witnessed this 23 day of February 1905.

SIGMUND STERNAU.
LIONEL STRASSBURGER.

Witnesses:
MAY I. HICKEY,
ROBT. E. TAYLOR.